United States Patent
Behera et al.

(10) Patent No.: US 12,242,524 B2
(45) Date of Patent: Mar. 4, 2025

(54) METHOD AND SYSTEM FOR PERFORMING A SEARCH IN A DATASET IN A MAINFRAME SESSION

(71) Applicant: JPMorgan Chase Bank, N.A., New York, NY (US)

(72) Inventors: Manas Kumar Behera, Hyderabad (IN); Velkumar Sashikumar, Salem (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/141,708

(22) Filed: May 1, 2023

(65) Prior Publication Data

US 2024/0256585 A1    Aug. 1, 2024

(30) Foreign Application Priority Data

Jan. 27, 2023    (IN) .............................. 202311005504

(51) Int. Cl.
*G06F 16/00* (2019.01)
*G06F 16/3332* (2025.01)
*G06F 16/338* (2019.01)

(52) U.S. Cl.
CPC ........ *G06F 16/3334* (2019.01); *G06F 16/338* (2019.01)

(58) Field of Classification Search
CPC ........................... G06F 16/3334; G06F 16/338
USPC .......................................................... 707/736
See application file for complete search history.

(56) References Cited

U.S. PATENT DOCUMENTS

| | | | |
|---|---|---|---|
| 2006/0075488 A1* | 4/2006 | Barrett | G06F 21/6227 726/22 |
| 2018/0246965 A1* | 8/2018 | Skorpil | G06F 9/452 |
| 2019/0251488 A1* | 8/2019 | Delfranco | G06F 16/951 |
| 2020/0344253 A1* | 10/2020 | Kurup | G06N 20/00 |
| 2021/0383291 A1* | 12/2021 | Elliott | G06F 16/951 |

* cited by examiner

*Primary Examiner* — Monica M Pyo
(74) *Attorney, Agent, or Firm* — GREENBLUM & BERNSTEIN, P.L.C.

(57) ABSTRACT

A method and a system for performing a search in a dataset in a mainframe session are disclosed. The method includes receiving at least one keyword associated with at least one query. The method includes identifying at least one from among at least one step containing the at least one keyword and at least one paragraph containing the at least one keyword based on the at least one query. The method includes tagging at least one identifier to at least one from among the at least one identified step and the at least one identified paragraph. Next, the method includes verifying the at least one tagged identifier. Thereafter, the method includes displaying at least one from among the at least one identified step and the at least one identified paragraph.

12 Claims, 5 Drawing Sheets

METHOD AND SYSTEM FOR PERFORMING A SEARCH IN A DATASET IN A MAINFRAME SESSION

CROSS-REFERENCE TO RELATED APPLICATIONS

This application claims priority benefit from Indian Application No. 202311005504, filed on Jan. 27, 2023 in the India Patent Office, which is hereby incorporated by reference in its entirety.

FIELD OF THE DISCLOSURE

This technology generally relates to methods and systems for performing a search in a dataset, and more particularly to methods and systems for performing the search in the dataset in a mainframe Time Sharing Option (TSO) session using an Artificial Intelligence (AI) based model.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admission of the prior art.

As is generally known, mainframe systems are mainly applied in sectors requiring high data throughput and reliability. The high reliability of mainframe systems is ensured through data redundancy. The mainframe systems are good for batch processing of data and have large storage capability thereby handling a large number of records. Additionally, the highly secure nature of mainframe computing makes it the most appropriate candidate for several major industries such as banking, insurance, and airlines.

One major drawback of the conventionally available mainframe systems is that performing a search in a dataset is a tedious and complicated task. The existing functions and search operators are not capable of providing the context in which a queried keyword is used in a dataset. The query raised by a user may consist of a plurality of keywords and the context in which each of the keywords is used in the dataset is important for making any decision related to the resolution of production problems in the mainframe system.

Hence, in view of these and other existing limitations, there arises an imperative need to provide an efficient solution to overcome the above-mentioned limitations and to provide a method and system for performing an efficient and reliable search in a dataset in a mainframe session.

SUMMARY

The present disclosure, through one or more of its various aspects, embodiments, and/or specific features or sub-components, provides, inter alia, various systems, servers, devices, methods, media, programs, and platforms for performing a search in a dataset in a mainframe session.

According to an aspect of the present disclosure, a method for performing a search in a dataset in a mainframe session is disclosed. The method is implemented by at least one processor. The method includes receiving, by the at least one processor via a communication interface, at least one keyword associated with at least one query. Further, the method includes identifying, by the at least one processor in the dataset using a trained model, at least one from among at least one step containing the at least one keyword and at least one paragraph containing the at least one keyword based on the at least one query. Next, the method includes tagging, by the at least one processor, at least one identifier to at least one from among the at least one identified step and the at least one identified paragraph based on the at least one query. Next, the method includes verifying, by the at least one processor, the at least one tagged identifier. The verifying the at least one tagged identifier results in one from among a successful verification of the at least one tagged identifier and an unsuccessful verification of the at least one tagged identifier. Thereafter, the method includes displaying, by the at least one processor via a display, at least one from among the at least one identified step and the at least one identified paragraph based on the successful verification of the at least one tagged identifier.

In accordance with an exemplary embodiment, the method further includes compressing the dataset in the mainframe session using a data compression technique.

In accordance with an exemplary embodiment, the at least one identifier includes at least one from among a member identifier, a query identifier, a step identifier, and a paragraph identifier.

In accordance with an exemplary embodiment, the at least one from among the at least one identified step and the at least one identified paragraph is displayed in a report format.

In accordance with an exemplary embodiment, the trained model includes an AI model.

In accordance with an exemplary embodiment, the at least one query is received for the identification of the at least one step in the dataset.

In accordance with an exemplary embodiment, the at least one query is received for the identification of the at least one paragraph in the dataset.

According to another aspect of the present disclosure, a computing device configured to implement the execution of a method for performing a search in a dataset in a mainframe session is disclosed. The computing device includes a processor; a memory; and a communication interface coupled to each of the processor and the memory. The processor may be configured to receive at least one keyword associated with at least one query. Next, the processor may be configured to identify, in the dataset using a trained model, at least one from among at least one step containing the at least one keyword and at least one paragraph containing the at least one keyword based on the at least one query. Next, the processor may be configured to tag at least one identifier to at least one from among the at least one identified step and the at least one identified paragraph based on the at least one query. Next, the processor may be configured to verify the at least one tagged identifier. The verification of the at least one tagged identifier may result in one from among a successful verification of the at least one tagged identifier and an unsuccessful verification of the at least one tagged identifier. Next, the processor may be configured to display at least one from among the at least one identified step and the at least one identified paragraph based on the successful verification of the at least one tagged identifier.

In accordance with an exemplary embodiment, the processor may be further configured to compress the dataset in the mainframe session using a data compression technique.

In accordance with an exemplary embodiment, the at least one identifier includes at least one from among a member identifier, a query identifier, a step identifier, and a paragraph identifier.

In accordance with an exemplary embodiment, the at least one from among the at least one identified step and the at least one identified paragraph is displayed in a report format.

In accordance with an exemplary embodiment, the trained model includes an AI model.

In accordance with an exemplary embodiment, the at least one query is received for the identification of the at least one step in the dataset.

In accordance with an exemplary embodiment, the at least one query is received for the identification of the at least one paragraph in the dataset.

According to yet another aspect of the present disclosure, a non-transitory computer-readable storage medium storing instructions for performing a search in a dataset in a mainframe session is disclosed. The instructions include executable code which, when executed by a processor, may cause the processor to receive, via a communication interface, at least one keyword associated with at least one query; receive, via the communication interface, at least one keyword associated with at least one query; identify, in the dataset using a trained model, at least one from among at least one step containing the at least one keyword and at least one paragraph containing the at least one keyword based on the at least one query; tag at least one identifier to at least one from among the at least one identified step and the at least one identified paragraph based on the at least one query; verify the at least one tagged identifier, wherein the verification of the at least one tagged identifier results in one from among a successful verification of the at least one tagged identifier and an unsuccessful verification of the at least one tagged identifier, and display at least one from among the at least one identified step and the at least one identified paragraph based on the successful verification of the at least one tagged identifier.

In accordance with an exemplary embodiment, the executable code when executed by the processor further causes the processor to compress the dataset in the mainframe session using a data compression technique.

In accordance with an exemplary embodiment, the at least one identifier includes at least one from among a member identifier, a query identifier, a step identifier, and a paragraph identifier.

In accordance with an exemplary embodiment, the at least one from among the at least one identified step and the at least one identified paragraph is displayed in a report format.

In accordance with an exemplary embodiment, the at least one query is received for the identification of the at least one step in the dataset.

In accordance with an exemplary embodiment, the at least one query is received for the identification of the at least one paragraph in the dataset.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
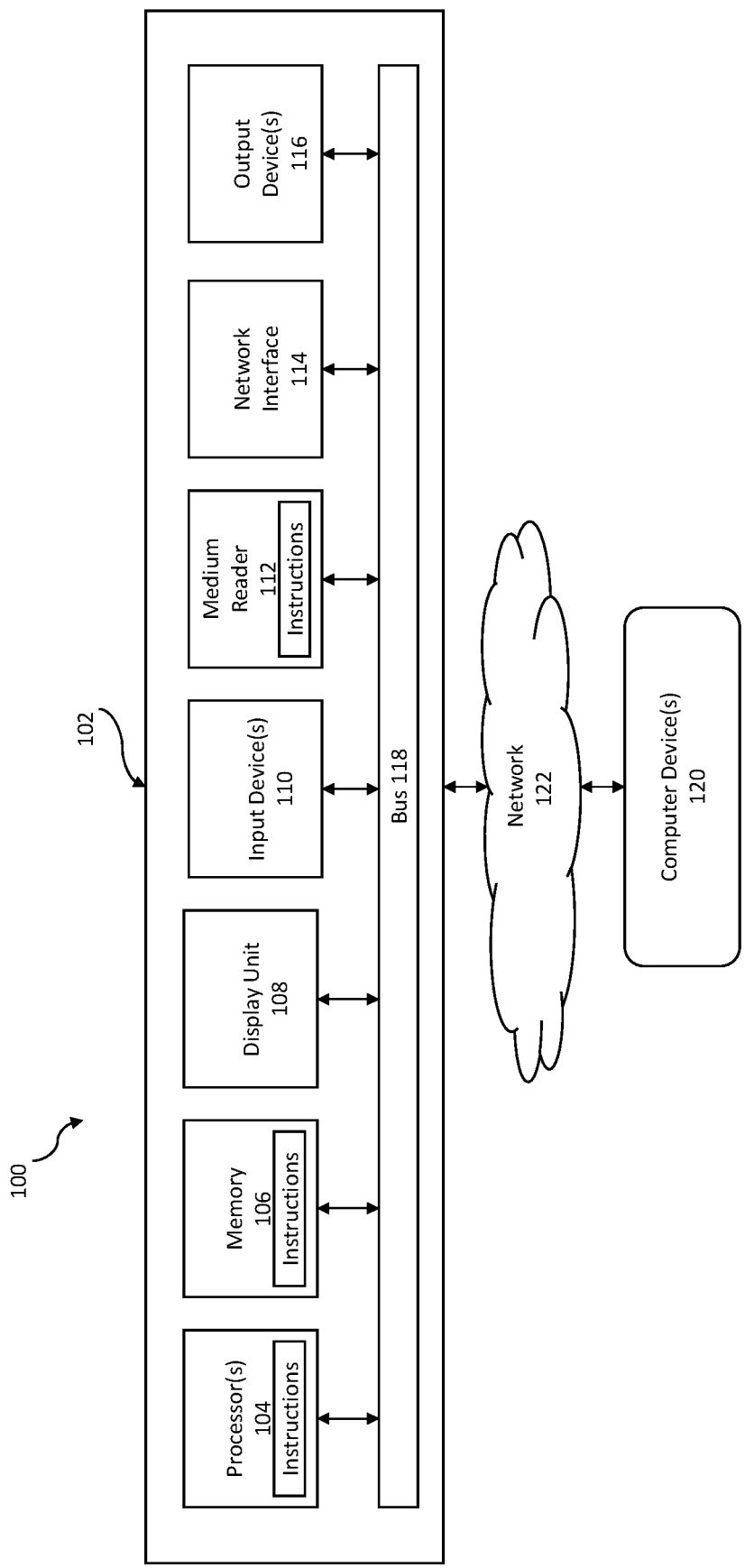
FIG. 1 illustrates an exemplary computer system for performing a search in a dataset in a mainframe session in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms may be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the invention. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable storage medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome problems associated with determining context in which at least one keyword associated with at least one query is used in a dataset in a mainframe session, the present disclosure provides a method and system for performing a reliable search in the dataset in the mainframe session. The system first receives the at least one keyword associated with the at least one query. In an example, the user enters at least one query related to a production problem at hand. In another example, the at least one query may be raised for storage planning, schedule planning, utility upgradation in the mainframe session, and the like. Next, the system identifies at least one from among at least one step containing the at least one keyword and at least one paragraph containing the at least one keyword in the dataset. In an example, the user raises the query for identification of the at least one step having the keyword "Data". Based on the request of the user, the system identifies the at least one step in the dataset that includes the keyword "Data". In another example, the user raises the at least one query for identification of the at least one paragraph that includes the keyword "Storage". Based on the request of the user, the system identifies the at least one paragraph in the dataset that includes the keyword "Storage". The system further compresses the dataset associated with the mainframe session using a data compression technique. In an example, the compression of the dataset reduces the time required to retrieve the at least one step from a plurality of steps and the at least one paragraph from a plurality of paragraph related to the at least one keyword present in the at least one query. In an exemplary embodiment, IEBPTPCH utility is used to compress the dataset to reduce the time and storage. In an exemplary embodiment, the identification of at least one of the at least one step containing the at least one keyword and the at least one paragraph containing the at least one keyword a may be facilitated by an AI based trained model.

In an exemplary embodiment, the system is customized to read and store dataset related to various types of applications. The mainframe system as disclosed is capable and configured to read and store dataset of various types and formats. In an example, even if Application A has log files of type X and Application B has log files of type Y, the mainframe system is capable to store and read log files of both Applications e.g., type X of Application A and type Y of Application B in the dataset. Thus, the present system and/or device is customizable as per the type of Application.

Further, the dataset may receive the log file by using a path of the log file, using a source of the log file, via uploading from a third-party platform, and the like. After identification of at least one of the at least one step containing the at least one keyword and the at least one paragraph containing the at least one keyword, the system tags at least one identifier (ID) to at least one from among the at least one identified step and the at least one identified paragraph. As used herein, ID may refer to an identifier or an identity provided to at least one from among a member, a query, a step, and a paragraph for purpose of verification. In an exemplary embodiment, the at least one identifier is also referred to as a composite identifier which includes a member identifier, a query identifier, a step identifier, and a paragraph identifier. In an exemplary embodiment, the composite identifier may include the step identifier, the member identifier, and the query identifier in an event the at least one query is received for the identification of the at least one step in the dataset. In an exemplary embodiment, the composite identifier may include the paragraph identifier, the member identifier, and the query identifier in an event the at least one query is received for the identification of the at least one paragraph in the dataset.

In an exemplary embodiment, the at least one identifier is tagged to at least one from among the at least one identified step and the at least one identified paragraph the mainframe Time Sharing Option (TSO) session based on the at least one query. In an example, the system identifies the at least one step from the plurality of step containing the term YY. Next, the system tags the at least one identifier which is defined for the query associated with identification of the at least one step. For example, the system tags the at least one identifier comprising of step identifier, the member identifier, and the query identifier in an event the at least one query is received for the identification of the at least one step in the dataset. Similarly, the system tags the at least one identifier comprising of paragraph identifier, the member identifier, and the query identifier in an event the at least one query is received for the identification of the at least one paragraph in the dataset. In an exemplary embodiment of the present disclosure, the Time-Sharing Option (TSO) session allows multiple users to interact with the system concurrently and independently using a terminal device without interfering with other users. In an exemplary embodiment, Common Business Oriented Language (COBOL) is used as the programming language in the mainframe TSO session.

Next, the system is configured to verify the at least one tagged identifier. The verification of the at least one tagged identifier results in one from among a successful verification of the at least one tagged identifier and an unsuccessful verification of the at least one tagged identifier. In an example, the at least one query is received for identification of the at least one step in the dataset. In another example, the at least one query is received for the identification of the at least one paragraph in the dataset. Thereafter, the system is configured to display at least one from among the at least one identified step and the at least one identified paragraph based on the successful verification of the at least one tagged identifier. In an example, at least one from among the at least one identified step and the at least one identified paragraph is displayed to the user in a report format.

In an exemplary embodiment, the at least one query is received for the identification of the at least one step in the dataset. The system retrieves the at least one step with the at least one keyword associated with the at least one query and is populated to an output file which may be formatted and sent to the user. In another exemplary embodiment, the query is received for identification of the at least one paragraph in the dataset. The system retrieves the at least one paragraph with the at least one keyword associated with the at least one query. Further, the at least one paragraph may be a COBOL paragraph or a COBOL Copybook Master variable. The at least one identified paragraph is populated into the output file which may be formatted and sent to the user. The output file may be formatted automatically using the Machine Learning (ML) based trained model. In an example, the report may be displayed in the form of a visual representation of a table that may aid the user in resolving a production problem, storage planning, utility upgradation, and the like.

In a non-limiting embodiment of the present disclosure, the system comprises an AI based prediction model. The AI model may use supervised and/or unsupervised ML techniques. In an example, the system identifies at least one of the at least one step containing the at least one keyword and the at least one paragraph containing the at least one keyword for a resolution of the production problem. The at least one of the at least one identified step and the at least one identified paragraph is stored in the database for future reference and prediction.

In an exemplary embodiment, the at least one query containing the at least one keyword is related to the resolution of the production problem. In general, the mainframe session may only provide the location of the at least one keyword related to the at least one query in the dataset. However, this process is time-consuming and the context in which the at least one keyword related to the at least one query used by the mainframe session is not provided to the user. Thus, the conventional solution is cumbersome and not recommended. Therefore, as per the solution of the present invention, the system is configured to identify at least one of the at least one step containing the at least one keyword from the plurality of steps and the at least one paragraph containing the at least one keyword from the plurality of paragraphs based on the at least one query. The system displays at least one from among the at least one identified step and the at least one identified paragraph in the report format for facilitating the decision-making related to the resolution of production problems. The user is provided with not just the location of the at least one keyword associated with the at least one query in the dataset but also the context in which the at least one keyword is used. Thus, the decision-making is facilitated, and the time required in accessing individual steps and paragraphs to understand the context is saved.

Therefore, the present disclosure aids in achieving a faster resolution of the production problem. The user is provided with the context in which the at least one keyword associated with the at least one query is used in the dataset. The implementation of the features of the present disclosure helps in determining the size of the storage required for a particular task or application. In another use case, the system may provide a detailed analysis of production problems, thereby facilitating the expedited resolution of the production problem. In yet another use case, the system is used in contention resolution and schedule planning where the ascertainment of the context of the at least one keyword helps to find the disposition of the at least one keyword in the dataset and plan ahead. Further, the system may provide relevant context related to the at least one keyword in the at least one query to aid in making decisions related to the upgradation of existing utilities in the mainframe system. The AI based prediction model disclosed in the present system is further capable of predicting the resolution of the production problems and creates the database of solutions mapped to production problems encountered by the mainframe system. The implementation of features of the present disclosure results in achieving better efficiency and performance owing to factors explained above. In an example, the factors include but is not limited to the expedited resolution of production problems, efficient utilization of storage resources, contention resolution and schedule planning, and aiding in decommission and upgradation of existing utilities.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As used herein, the term "query" corresponds to identification of at least one of at least one step and at least one paragraph containing the least one keyword associated with a production problem in a mainframe system.

As used herein, the phrase "at least one identified step" corresponds to a presence of steps in the dataset containing the at least one keyword associated with at least one query.

As used herein, the phrase "at least one identified paragraph" corresponds to COBOL paragraphs or COBOL Copybook Master variable containing the at least one keyword associated with the at least one query.

As used herein, at least one identifier corresponds to at least one from among a member identifier, a query identifier, a step identifier, and a paragraph identifier used in the mainframe session.

As used herein, the term "report" corresponds to a visual representation of at least one of the at least one step containing the at least one keyword and the at least one paragraph containing the at least one keyword in the dataset for the resolution of the production problem.

As illustrated in FIG. 1, the computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present invention, the computer memory 106 may comprise any combination of memories or a single storage.

The computer system 102 may further include a Display Unit 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for performing a search in a dataset in the mainframe session.

Figure 2:
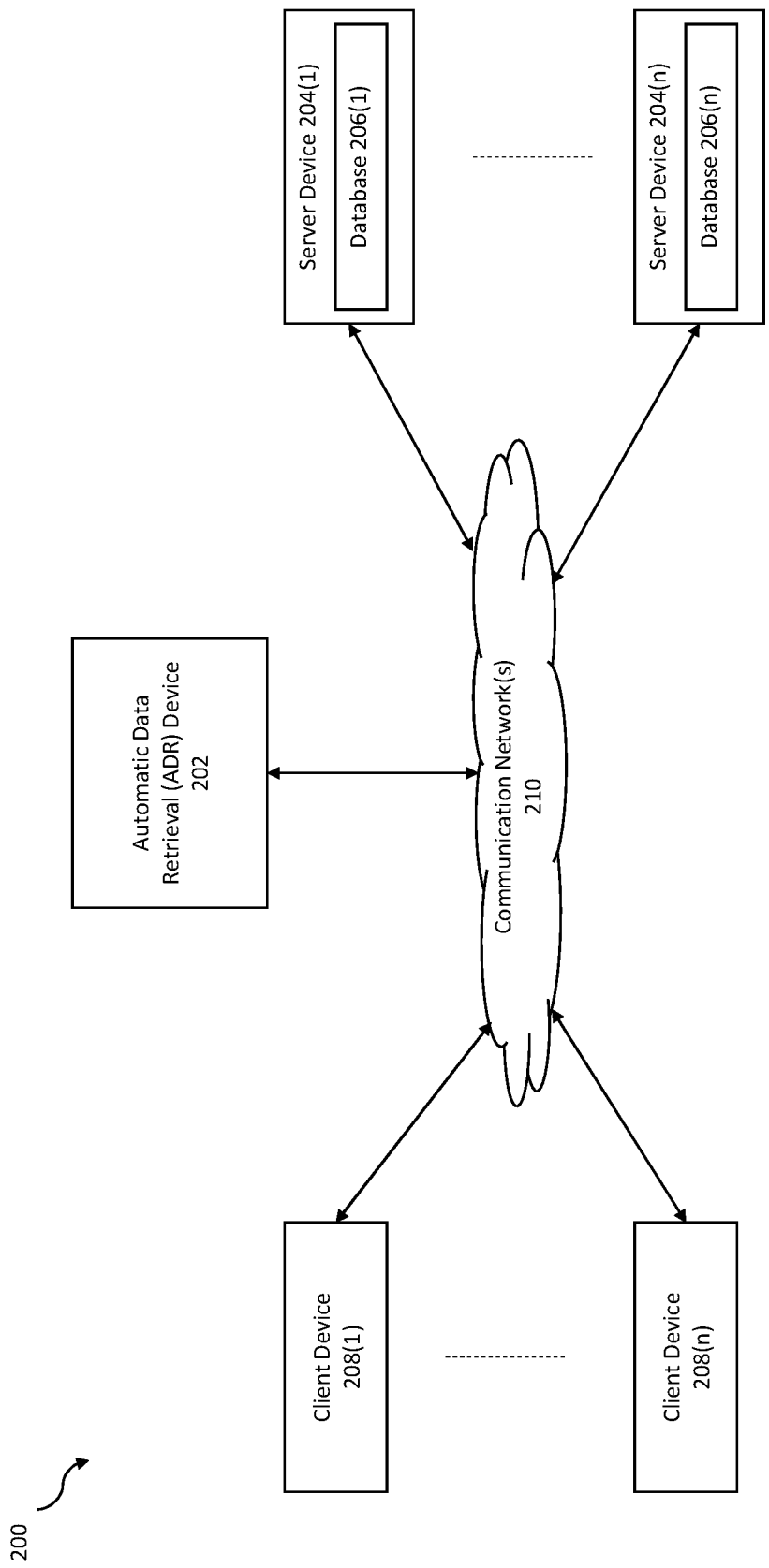
FIG. 2 illustrates an exemplary diagram of a network environment for performing a search in a dataset in a mainframe session in accordance with an exemplary embodiment.

Referring to FIG. 2, a schematic of an exemplary network environment 200 for implementing a method for performing a search in a dataset in a mainframe session is illustrated. In an exemplary embodiment, the method is executable on any networked computer platform, such as, for example, a personal computer (PC).

The method for performing the search in the dataset in the mainframe session may be implemented by an Automatic Data Retrieval (ADR) device 202. The ADR device 202 may be the same or similar to the computer system 102 as described with respect to FIG. 1. The ADR device 202 may store one or more applications that can include executable instructions that, when executed by the ADR device 202, cause the ADR device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the ADR device 202 itself, may be located in the virtual server(s) running in a cloud-based computing environment rather than being tied to one or more specific physical network computing devices. Also, the application(s) may be running in one or more virtual machines (VMs) executing on the ADR device 202. Additionally, in one or more embodiments of this technology, virtual machine(s) running on the ADR device 202 may be managed or supervised by a hypervisor.

In the network environment 200 of FIG. 2, the ADR device 202 is coupled to a plurality of server devices 204(1)-204(n) that hosts a plurality of databases 206(1)-206(n), and also to a plurality of client devices 208(1)-208(n) via communication network(s) 210. A communication interface of the ADR device 202, such as the network interface 114 of the computer system 102 of FIG. 1, operatively couples and communicates between the ADR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer-readable media, and ADR devices that efficiently implement a method for performing the search in the dataset in the mainframe session based on at least one keyword associated with at least one query.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Networks (PSTNs), Ethernet-based Packet Data Networks (PDNs), combinations thereof, and the like.

The ADR device 202 may be a standalone device or integrated with one or more other devices or apparatuses, such as one or more of the server devices 204(1)-204(n), for example. In one particular example, the ADR device 202 may include or be hosted by one of the server devices 204(1)-204(n), and other arrangements are also possible. Moreover, one or more of the devices of the ADR device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the ADR device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to resolution of production problem, storage planning, schedule planning, dataset related to the prediction of resolution to production problem, ML model.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ADR device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, i.e., a smartphone.

The client devices 208(1)-208(n) may run interface applications, such as standard web browsers or standalone client applications, which may provide an interface to communicate with the ADR device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ADR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADR device 202, the server devices 204(1)-204(n), or the client devices 208(1)-208(n), for example, may be configured to operate as virtual instances on the same physical machine. In other words, one or more of the ADR device 202, the server devices 204(1)-204(n), or the client devices 208(1)-208(n) may operate on the same physical device rather than as separate devices communicating through communication network(s) 210. Additionally, there may be more or fewer ADR devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
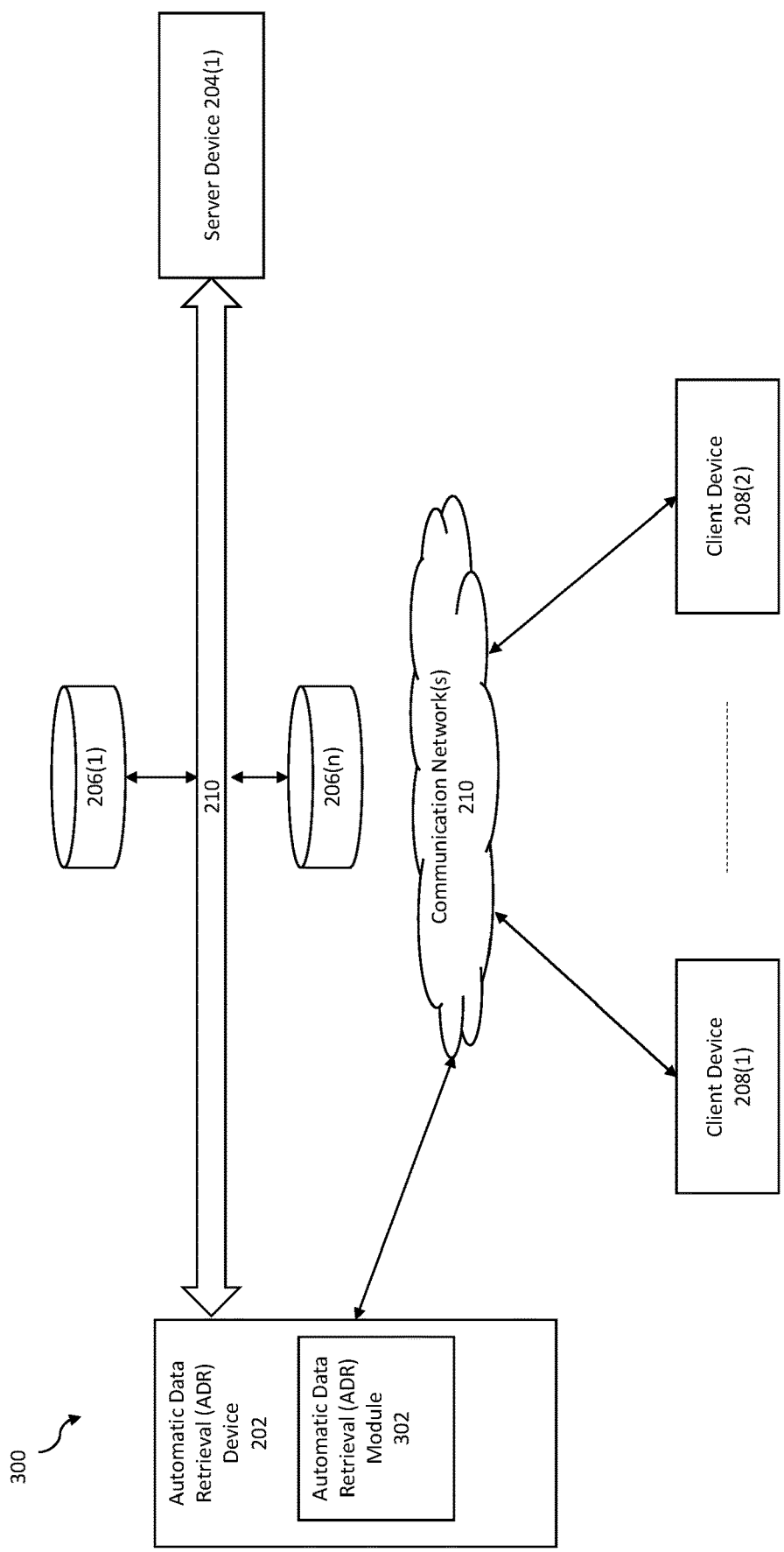
FIG. 3 illustrates an exemplary system for performing a search in a dataset in a mainframe session in accordance with an exemplary embodiment.

FIG. 3 illustrates an exemplary system for implementing a method for performing a search in a dataset in a mainframe session, in accordance with an embodiment of the present disclosure. As illustrated in FIG. 3, according to exemplary embodiments, the system 300 may comprise an ADR device 202 including an Automatic Data Retrieval (ADR) module 302 that may be connected to a server device 204(1) and one or more repository from the repositories 206(1) . . . 206(n) via a communication network 210, but the disclosure is not limited thereto.

The ADR device 202 is described and shown in FIG. 3 as including an Automatic Data Retrieval (ADR) module 302, although it may include other rules, policies, modules, databases, or applications, for example. As will be described below, the ADR module 302 is configured to implement a method for performing the search in the dataset in the mainframe session.

An exemplary process 300 for implementing a mechanism for performing the search in the dataset in the mainframe session by utilizing the network environment of FIG. 2 is shown as being executed in FIG. 3. Specifically, a first client device 208(1) and a second client device 208(2) are illustrated as being in communication with ADR device 202. In this regard, the first client device 208(1) and the second client device 208(2) may be "clients" of the ADR device 202 and are described herein as such. Nevertheless, it is to be known and understood that the first client device 208(1) and/or the second client device 208(2) need not necessarily be "clients" of the ADR device 202, or any entity described in association therewith herein. Any additional or alternative relationship may exist between either or both of the first client device 208(1) and the second client device 208(2) and the ADR device 202, or no relationship may exist.

Further, the ADR device 202 is illustrated as being able to access one or more repositories 206(1) . . . 206(n). The ADR module 302 may be configured to access these repositories/databases for implementing the method for performing the search in the dataset in a mainframe Time Sharing Option (TSO) session.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the ADR device 202 via broadband or cellular communication. Of course, these embodiments are merely exemplary and are not limiting or exhaustive.

Figure 4:
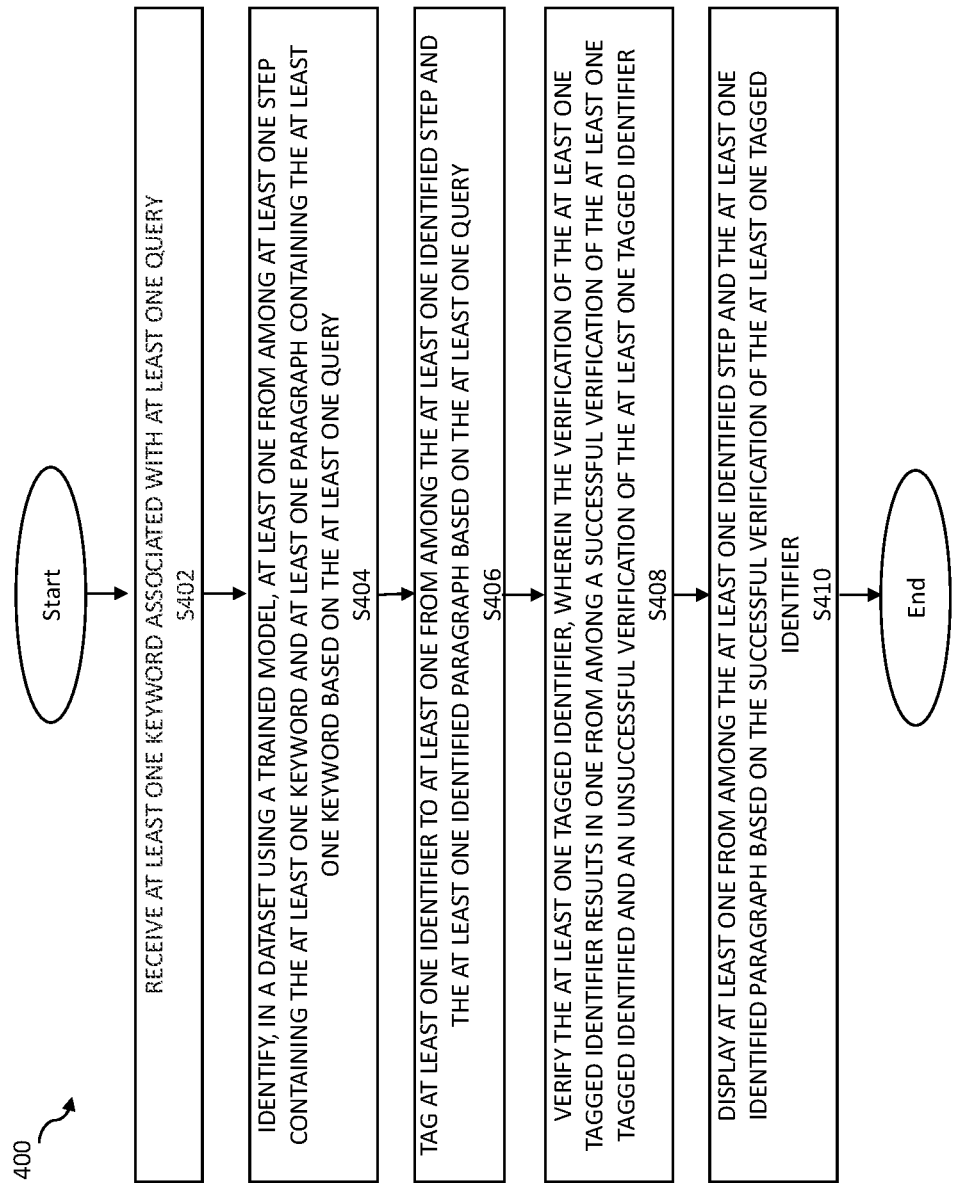
FIG. 4 illustrates an exemplary method flow diagram for performing a search in a dataset in the mainframe session in accordance with an exemplary embodiment.

FIG. 4 illustrates an exemplary method 400 for performing a search in a dataset in a mainframe session, in accordance with an embodiment of the present disclosure. As shown in FIG. 4, the method begins at step S402 following a need for the resolution of a production problem in the mainframe session.

At step S402, the method includes receiving, by at least one processor 104 via a communication interface, at least one keyword associated with at least one query. In a non-limiting embodiment, the at least one keyword associated with the at least one query is received from a plurality of sources such as from a user, from a system, from a third-party platform and the like. In an example, the at least one query may be associated with resolution of the production problem encountered in the mainframe session. In another example, the at least one query may be associated with storage planning, contention resolution, schedule planning, decommission and/or upgradation of existing utilities, and the like in the mainframe session. In an exemplary embodiment, the method includes the step of compressing the dataset in the mainframe session using a data compression technique to deal with a large amount of data in the mainframe session. In an example, the method relies upon IEBPTPCH utility to compress the dataset and to reduce the time required for retrieval of at least one of the at least one step and the at least one paragraph in the compressed dataset. In an exemplary embodiment, the at least one query may be received for the identification of the at least one step in the dataset. In an exemplary embodiment, the at least one query may be received for the identification of at least one paragraph in the dataset.

At step S404, the method includes identifying, by the at least one processor 104 in the dataset using a trained model, at least one from among the at least one step containing the at least one keyword and the at least one paragraph containing the at least one keyword based on the at least one query. In a non-limiting embodiment, the trained model may correspond to an AI based model that recommends and predicts the resolution of production problems. Further, the AI based model uses the dataset containing data logs for prediction and recommendation of resolution of the production problems.

The AI based model may apply AI based algorithms to analyze an input associated with the at least one query. The AI model may include supervised learning-based ML techniques or unsupervised learning-based ML techniques. A supervised learning model uses training data to build the model. Training data includes the dataset that is labeled. The label represents how a piece of data in the dataset should be classified. The supervised learning model learns from the labeled dataset to apply new label to new dataset during run time. For example, the supervised learning model may build a decision tree using the training data to classify new dataset. The supervised learning model include, for example, any one or more of k-method analysis, regression analysis, decision tree analysis, random forest analysis, k-nearest neighbor's analysis, logistic regression analysis, k-fold cross-validation analysis, balanced class weight analysis, and the like.

An unsupervised ML model analyzes input data, organizes the data (e.g., clustering, grouping, linking data items, etc.), and generates an output that characterizes the way the data is organized. This may involve organizing input data into clusters and/or identifying outliers. Unsupervised learning models include, for example, K-Means, Mean-Shift, density-based spatial clustering applications with noise (DBSCAN), Fuzzy C-Means, or Isolation Forests and the like.

At step S406, the method includes tagging, by the at least one processor 104, at least one identifier to at least one from among the at least one identified step and the at least one identified paragraph based on the at least one query. In an exemplary embodiment, the at least one identifier includes at least one from among a member identifier, a query identifier, a step identifier, and a paragraph identifier. In an example, the at least one step includes the steps containing the at least one keyword. Similarly, the at least one paragraph includes the COBOL paragraphs containing the at least one keyword. In a non-limiting exemplary embodiment, the mainframe SORT utility is used to tag at least one identifier that includes at least one from among the member identifier, the query identifier, the step identifier, and the paragraph identifier for the at least one keyword associated with the at least one query.

At step S408, the method includes verifying, by the at least one processor 104, the at least one tagged identifier. In an example, the identifier assigned to a step, a paragraph, a member, and the at least one query is matched with a corresponding parameter associated with the compressed dataset in the mainframe session, thereby ensuring that the context of the at least one keyword identified by the method disclosed herein is accurate, secure, and error-free. In a non-limiting example, the identifier assigned to the step, the paragraph, the member, and the at least one query is matched with the corresponding parameters stored in the database associated with the mainframe session. The verification of the at least one tagged identifier results in one from among a successful verification of the at least one tagged identifier and an unsuccessful verification of the at least one tagged identifier.

At step S410, the method includes displaying, by the at least one processor via a Display 108, at least one from among the at least one identified step and the at least one identified paragraph based on the successful verification of the at least one tagged identifier. The result of the successful verification corresponds to the matching of the identifier assigned to the step, the paragraph, the member, and the at least one query with the corresponding parameters associated with the compressed dataset. In an example, at least one from among the at least one identified step and the at least one identified paragraph is displayed in a report format. In an example, the report may be displayed in form of a visual representation such as tables and graphs. For instance, the report may be used by the user for decision-making related to the resolution of production problems, storage planning, schedule planning, contention resolution, decommission or upgradation of the existing utilities, and the like.

Figure 5:
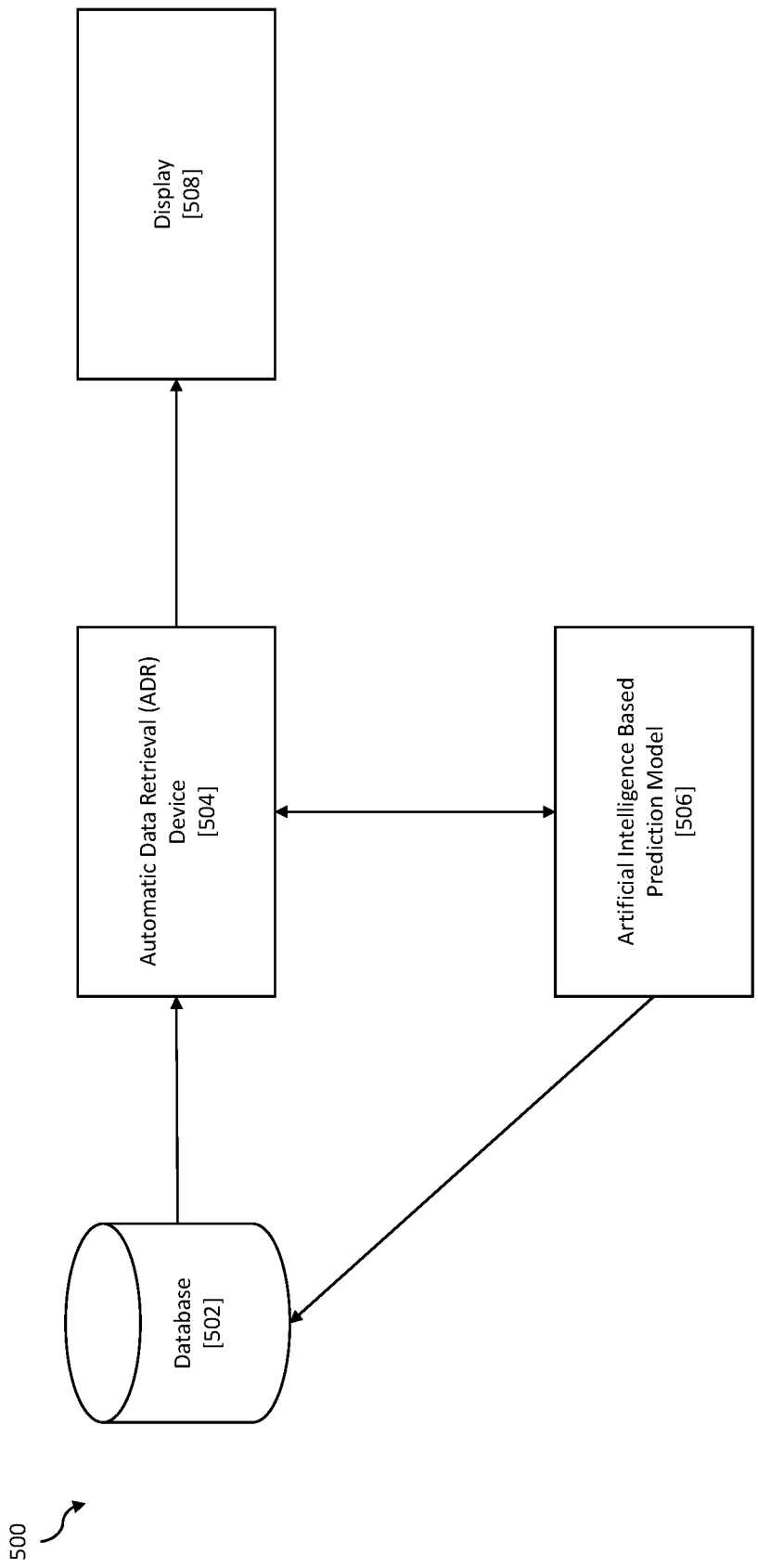
FIG. 5 illustrates a process flow diagram usable for implementing a method for performing a search in a dataset in the mainframe session in accordance with an exemplary embodiment.

FIG. 5 illustrates a process flow diagram usable for implementing a method for performing a search in a dataset in a mainframe session, in accordance with an embodiment of the present disclosure. The process flow 500 begins with receiving at least one query with at least one keyword. In an example, the at least one query may be associated with contention resolution in the mainframe session and with the at least one keyword to be found in the dataset or the database 502. The Automatic Data Retrieval (ADR) device 504 retrieves, in the dataset, at least one of at least one step containing the at least one keyword and at least one paragraph containing the at least one keyword. Further, the ADR device 504 interacts with an AI based prediction model 506. The AI based prediction model receives training data from the ADR device 504 and additionally, the AI based prediction model recommends response to the at least one query based on the trained model. The AI based prediction model 506 further interacts with the database 502 to create a set of data logs within the database 502, where the set of data logs is related to the at least one query and predicted resolution to the production problems. Further, at least one of the at least one step containing the at least one keyword and the at least one paragraph containing the at least one keyword, retrieved by the ADR device 504, is sent to the display 508, which is customized to display at least one of the at least one step containing the at least one keyword and the at least one paragraph containing the at least one keyword in the form of a report. The display 508 is further customized to rely on at least one processor to format the report and to aid in decision-making. The ADR device 504 relies upon the present disclosure to perform the search in the dataset in the mainframe session and to retrieve the at least one step including the at least one keyword or the at least one paragraph including the at least one keyword based on the at least one query, thereby providing the context in which the at least one keyword is used in the dataset.

In an example, the at least one query is associated with storage planning in a mainframe system. The system retrieves the location of the at least one keyword along with the context in which the at least one keyword is used in the dataset and provides a systematic response in form of the report. The user relies on the report to make a decision related to the storage planning and therefore, the user need not access each location in the dataset where the at least one keyword associated with the at least one query is located.

Accordingly, with this technology, an optimized process for performing the search in the dataset in the mainframe session is disclosed. As evident from the above disclosure, the present solution provides significant technical advancement over the existing solutions by ensuring that the user is provided with a holistic view of the context in which the at least one keyword associated with the at least one query is used in the dataset. The use of the present technology provides expedited resolution of production problems as the dataset is compressed and the AI based prediction model is used to predict and recommend a resolution of future production problems. The technical advancement achieved by the implementation of the present disclosure includes but is not limited to expedited resolution of production problems, efficient utilization of storage resources, contention resolution, schedule planning, aid in decommission and upgradation of the existing utilities in the mainframe session, and the like.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory.

Additionally, the computer-readable medium can include a magneto-optical or optical medium, such as a disk or tape, or other storage device to capture carrier wave signals such as a signal communicated over a transmission medium. Accordingly, the present disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to another aspect of the present disclosure, a non-transitory computer-readable storage medium storing instructions for performing a search in a dataset in a mainframe session is disclosed. The instructions include executable code which, when executed by a processor, may cause the processor to receive at least one keyword associated with at least one query. In an exemplary embodiment of the present disclosure, the at least one query may be received for identification of at least one step in the dataset. In another embodiment of the present disclosure, the at least one query may be received for the identification of at least one paragraph in the dataset. Also, when executed by the processor the executable code causes the processor to identify, in the dataset using a trained model, at least one of the at least one step containing the at least one keyword and the at least one paragraph containing the at least one keyword based on the at least one query. The trained model includes an AI model. Thereafter, when executed by the processor, the executable code causes the processor to tag at least one identifier to at least one from among the at least one identified step and the at least one identified paragraph based on the at least one query. The at least one identifier includes at least one from among a member identifier, a query identifier, a step identifier, and a paragraph identifier. Thereafter, when executed by the processor, the executable code causes the processor to verify the at least one tagged identifier. The verification of the at least one tagged identifier results in one of a successful verification of the at least one tagged identifier and an unsuccessful verification of the at least one tagged identifier. Thereafter, when executed by the processor, the executable code causes the processor to display at least one from among the at least one identified step and the at least one identified paragraph based on the successful verification of the at least one tagged identifier. The at least one from among the at least one identified step and the at least one identified paragraph is displayed in a report format.

In an exemplary embodiment, the executable code, when executed further causes the processor to compress the dataset in the mainframe session using a data compression technique.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating resolution of a mainframe production problem experienced by a mainframe and increasing the speed at which a mainframe resolves the mainframe production problem, the method being implemented by at least one processor, the method comprising:

receiving, by the at least one processor via a communication interface, at least one keyword associated with at least one query for resolving the mainframe production problem;

compressing, with at least one processor, a dataset stored in the mainframe to be searched using the at least one keyword to reduce a retrieval time for retrieving at least part of the dataset stored in the mainframe during a search for the received at least one keyword in the dataset;

identifying during a mainframe session, by the at least one processor, in the dataset at least one step or paragraph containing the at least one keyword based on the at least one query using a trained artificial-intelligence, machine-learning model
trained on training data of a labeled dataset identifying how its data should be classified to learn from the labeled dataset of the training data how to classify data in the dataset stored in the mainframe, and
using one or more of a k-method analysis, a regression analysis, a decision tree analysis, a random forest analysis, a k-nearest neighbor's analysis, a logistic regression analysis, a k-fold cross-validation analysis, and a balanced class weight analysis;

tagging, by the at least one processor, the at least one identified step with a composite identifier or tagging the at least one identified paragraph with the composite identifier, the composite identifier including a query identifier, a step identifier, and a paragraph identifier;

verifying, by the at least one processor, the at least one tagged identifier by matching the at least one tagged identifier with a corresponding parameter a) associated with the compressed dataset in the mainframe session and b) stored in a database associated with the mainframe session, thereby ensuring the accuracy of the search, wherein the verifying of the at least one tagged identifier results in one from among a) a successful verification of the at least one tagged identifier and b) an unsuccessful verification of the at least one tagged identifier;

using, by the at least one processor, the trained artificial-intelligence, machine-learning model to generate in the database a set of data logs related to the at least one query and resolution of the mainframe production problem and to provide a recommendation to resolve the mainframe production problem using the generated set of data logs;

populating, by the at least one processor, an output file with the retrieved at least one identified step or paragraph;

using the trained artificial-intelligence, machine-learning model to automatically format the output file, by the at least one processor, in response to a successful verification of the at least one tagged identifier; and controlling, by the at least one processor, a liquid crystal display, an organic light emitting diode, a flat panel display, a solid-state display, a cathode ray tube display, or a plasma display to display a visual representation of the formatted output file containing the at least one identified step or paragraph for facilitating the resolving of the mainframe production problem in response to the successful verification of the at least one tagged identifier.

2. The method as claimed in claim 1, wherein the visual representation of the formatted output file containing the at least identified step or paragraph is displayed in a report format including a table or graph.

3. The method as claimed in claim 1, wherein the at least one query is received for the identification of the at least one step in the dataset.

4. The method as claimed in claim 1, wherein the at least one query is received for the identification of the at least one paragraph in the dataset.

5. A computing device configured to implement an execution of a method for facilitating resolution of a mainframe production problem experienced by a mainframe and increasing the speed at which a mainframe resolves the mainframe production problem, the computing device comprising:

a processor;

a memory; and a communication interface coupled to each of the processor and the memory, wherein the processor is configured to:

receive, via the communication interface, at least one keyword associated with at least one query for resolving the mainframe production problem;

compress a dataset stored in the mainframe to be searched using the at least one keyword to reduce a retrieval time for retrieving at least part of the dataset stored in the mainframe during a search for the received at least one keyword in the dataset;

identify during a mainframe session, in the dataset, at least one step or paragraph containing the at least one keyword based on the at least one query using a trained artificial-intelligence, machine-learning model trained on training data of a labeled dataset identifying how its data should be classified to learn from the labeled dataset of the training data how to classify data in the dataset stored in the mainframe, and using one or more of a k-method analysis, a regression analysis, a decision tree analysis, a random forest analysis, a k-nearest neighbor's analysis, a logistic regression analysis, a k-fold cross-validation analysis, and a balanced class weight analysis;

tag the at least one identified step with a composite identifier or tag the at least one paragraph with the composite identifier, the composite identifier including a query identifier, a step identifier, and a paragraph identifier;

verify the at least one tagged identifier by matching the at least one tagged identifier with a corresponding parameter a) associated with the compressed dataset in the mainframe session and b) stored in a database associated with the mainframe session, thereby ensuring the accuracy of the search, wherein the verification of the at least one tagged identifier results in one from among a) a successful verification of the at least one tagged identifier and b) an unsuccessful verification of the at least one tagged identifier;

use the trained artificial-intelligence, machine-learning model to generate in the database a set of data logs related to the at least one query and resolution of the mainframe production problem and to provide a recommendation to resolve the mainframe production problem using the generated set of data logs;

populate an output file with the retrieved at least one identified step or paragraph;

use the trained artificial-intelligence, machine-learning model to automatically format the output file, by the at least one processor, in response to a successful verification of the at least one tagged identifier; and control a liquid crystal display, an organic light emitting diode, a flat panel display, a solid-state display, a cathode ray tube display, or a plasma display to display a visual representation of the formatted output file containing the at least one identified step or paragraph for facilitating the resolving of the mainframe production problem in response to the successful verification of the at least one tagged identifier.

6. The computing device as claimed in claim 5, wherein the visual representation of the formatted output file containing the at least one identified step or paragraph is displayed in a report format including a table or graph.

7. The computing device as claimed in claim 5, wherein the at least one query is received for the identification of the at least one step in the dataset.

8. The computing device as claimed in claim 5, wherein the at least one query is received for the identification of the at least one paragraph in the dataset.

9. A non-transitory computer readable storage medium storing instructions for facilitating resolution of a mainframe production problem experienced by a mainframe and increasing the speed at which a mainframe resolves the mainframe production problem, the instructions comprising executable code which, when executed by a processor, causes the processor to:

receive, via a communication interface, at least one keyword associated with at least one query for resolving the mainframe production problem;

compress a dataset stored in the mainframe to be searched using the at least one keyword to reduce a retrieval time for retrieving at least part of the dataset stored in the mainframe during a search for the received at least one keyword in the dataset;

identify during a mainframe session, in the dataset at least one step containing the at least one keyword from a plurality of steps or at least one paragraph containing the at least one keyword from a plurality of paragraphs based on the at least one query using a trained artificial-intelligence, machine-learning model trained on training data of a labeled dataset identifying how its data should be classified to learn from the labeled dataset of the training data how to classify data in the dataset stored in the mainframe, and using one or more of a k-method analysis, a regression analysis, a decision tree analysis, a random forest analysis, a k-nearest neighbor's analysis, a logistic regression analysis, a k-fold cross-validation analysis, and a balanced class weight analysis;

tag the at least one identified step with a composite identifier or tag the at least one identified paragraph with the composite identifier, the composite identifier including a query identifier, a step identifier, and a paragraph identifier;

verify the at least one tagged identifier by matching the at least one tagged identifier with a corresponding parameter a) associated with the compressed dataset in the mainframe session and b) stored in a database associated with the mainframe session, thereby ensuring the accuracy of the search, wherein the verification of the at least one tagged identifier results in one from among a) a successful verification of the at least one tagged identifier and b) an unsuccessful verification of the at least one tagged identifier;

use the trained artificial-intelligence, machine-learning model to generate in the database a set of data logs related to the at least one query and resolution of the mainframe production problem and to provide a recommendation to resolve the mainframe production problem using the generated set of data logs;

populate an output file with the retrieved at least one identified step or paragraph;

use the trained artificial-intelligence, machine-learning model to automatically format the output file, in response to a successful verification of the at least one tagged identifier; and control a liquid crystal display, an organic light emitting diode, a flat panel display, a solid-state display, a cathode ray tube display, or a plasma display to display a visual representation of the formatted output file containing the at least one identified step or paragraph for facilitating the resolving of the mainframe production problem in response to the successful verification of the at least one tagged identifier.

10. The non-transitory computer readable storage medium as claimed in claim 9, wherein the visual representation of the formatted output file containing the at least one identified step or paragraph is displayed in a report format including a table or graph.

11. The non-transitory computer readable storage medium as claimed in claim 9, wherein the at least one query is received for the identification of the at least one step in the dataset.

12. The non-transitory computer readable storage medium as claimed in claim 9, wherein the at least one query is received for the identification of the at least one paragraph in the dataset.

* * * * *